US011112673B2

(12) United States Patent
Tonar

(10) Patent No.: US 11,112,673 B2
(45) Date of Patent: Sep. 7, 2021

(54) POLARIZED WINDOW ASSEMBLY

(71) Applicant: Gentex Corporation, Zeeland, MI (US)

(72) Inventor: William L. Tonar, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 126 days.

(21) Appl. No.: 16/525,184

(22) Filed: Jul. 29, 2019

(65) Prior Publication Data
US 2019/0353969 A1 Nov. 21, 2019

Related U.S. Application Data

(63) Continuation of application No. 15/717,022, filed on Sep. 27, 2017, now Pat. No. 10,451,949.
(Continued)

(51) Int. Cl.
G02F 1/157 (2006.01)
G02F 1/1503 (2019.01)
(Continued)

(52) U.S. Cl.
CPC ............ G02F 1/1503 (2019.01); B60R 1/088 (2013.01); E06B 9/24 (2013.01); G02F 1/01 (2013.01); G02F 1/153 (2013.01); G02F 1/157 (2013.01); G09G 3/38 (2013.01); B32B 17/10513 (2013.01); B60Q 1/2665 (2013.01); B60R 1/12 (2013.01); E06B 2009/2464 (2013.01); G02B 5/003 (2013.01); G02F 1/133536 (2013.01);
(Continued)

(58) Field of Classification Search
CPC .. B60R 1/088; B60R 1/12; E06B 9/24; G09G 3/38; B32B 17/10513; G02F 2201/08; G02F 2203/11; G02F 1/01; G02F 1/153; G02F 1/155; G02F 1/157; G02F 1/133536; G02F 1/1503; B60Q 1/2665; G02B 5/003
USPC ................................................. 359/267, 275
See application file for complete search history.

(56) References Cited

U.S. PATENT DOCUMENTS 5,274,493 A 12/1993 Couput et al.
6,084,702 A 7/2000 Byker et al.
(Continued)

FOREIGN PATENT DOCUMENTS

EP 2128688 A1 12/2009
JP H07108769 B2 11/1995
(Continued)

Primary Examiner — William R Alexander
(74) Attorney, Agent, or Firm — Price Heneveld LLP; Bradley D. Johnson

(57) ABSTRACT

A window assembly includes an electro-optic element which has a first substantially transparent substrate defining first and second surfaces. The second surface includes a first electrically conductive layer. A second substantially transparent substrate defines third and fourth surfaces. The third surface includes a second electrically conductive layer. A primary seal is disposed between the first and second substrates. The seal and the first and second substrates define a cavity therebetween. An electro-optic medium is disposed in the cavity. The electro-optic medium is switchable such that the electro-optic element is operable between substantially clear and darkened states. An absorptive layer is positioned on the fourth surface of the electro-optic element and a reflective layer is positioned on the absorptive layer.

19 Claims, 7 Drawing Sheets

Related U.S. Application Data

(60) Provisional application No. 62/406,184, filed on Oct. 10, 2016.

(51) Int. Cl.

| | | |
|---|---|---|
| *G02F 1/153* | (2006.01) | |
| *B60R 1/08* | (2006.01) | |
| *G02F 1/01* | (2006.01) | |
| *G09G 3/38* | (2006.01) | |
| *E06B 9/24* | (2006.01) | |
| *G02F 1/155* | (2006.01) | |
| *B32B 17/10* | (2006.01) | |
| *B60R 1/12* | (2006.01) | |
| *B60Q 1/26* | (2006.01) | |
| *G02B 5/00* | (2006.01) | |
| *G02F 1/1335* | (2006.01) | |

(52) U.S. Cl.
CPC .......... *G02F 1/155* (2013.01); *G02F 2201/08* (2013.01); *G02F 2203/11* (2013.01)

(56) References Cited

U.S. PATENT DOCUMENTS

| | | | |
|---|---|---|---|
| 6,710,823 B2* | 3/2004 | Faris | G02F 1/133621 349/16 |
| 7,605,348 B2 | 10/2009 | Byers et al. | |
| 7,656,581 B2* | 2/2010 | Giraudet | A42B 3/226 359/486.02 |
| 7,910,859 B2 | 3/2011 | Byers et al. | |
| 8,282,253 B2 | 10/2012 | Lynam et al. | |
| 8,743,048 B2 | 6/2014 | Takahashi et al. | |
| 8,833,987 B2 | 9/2014 | Lynam | |
| 8,920,151 B2 | 12/2014 | Meinzinger et al. | |
| 9,176,357 B2 | 11/2015 | Lam et al. | |
| 9,256,085 B2* | 2/2016 | McCarthy | E06B 3/6722 |
| 9,459,491 B2 | 10/2016 | Yi | |
| 9,601,299 B2 | 3/2017 | Chuang et al. | |
| 2002/0075552 A1 | 6/2002 | Poll et al. | |
| 2002/0118328 A1* | 8/2002 | Faris | F24S 50/80 349/114 |
| 2002/0135881 A1 | 9/2002 | Rukavina et al. | |
| 2004/0229049 A1 | 11/2004 | Boire et al. | |
| 2006/0066508 A1* | 3/2006 | Walck | G02B 27/01 345/7 |
| 2006/0274218 A1 | 12/2006 | Xue | |
| 2007/0146574 A1* | 6/2007 | Giraudet | A42B 3/226 349/86 |
| 2007/0218217 A1* | 9/2007 | Fernando | G02F 1/133305 428/1.31 |
| 2008/0252846 A1* | 10/2008 | Biver | G02C 7/12 351/159.81 |
| 2009/0040588 A1* | 2/2009 | Tonar | G02F 1/1533 359/267 |
| 2009/0284670 A1* | 11/2009 | Xue | G02F 1/133536 349/16 |
| 2014/0141192 A1* | 5/2014 | Fernando | E06B 3/6775 428/76 |
| 2014/0175281 A1* | 6/2014 | Reynolds | G02F 1/163 250/338.1 |
| 2014/0300945 A1* | 10/2014 | Parker | E06B 3/6722 359/275 |
| 2014/0333983 A1* | 11/2014 | McCarthy | E06B 9/24 359/288 |
| 2015/0153495 A1* | 6/2015 | Matsuda | B05D 5/06 349/194 |
| 2015/0251746 A1 | 9/2015 | Schmid et al. | |
| 2018/0286908 A1 | 10/2018 | Yamazaki et al. | |
| 2019/0066962 A1 | 2/2019 | Chuang et al. | |

FOREIGN PATENT DOCUMENTS

| | | |
|---|---|---|
| KR | 2004008445 A | 10/2004 |
| WO | 2008051910 A2 | 5/2008 |

* cited by examiner

US 11,112,673 B2

POLARIZED WINDOW ASSEMBLY

CROSS-REFERENCE TO RELATED APPLICATION

This application is a continuation of U.S. patent application Ser. No. 15/717,022, filed on Sep. 27, 2017, entitled POLARIZED WINDOW ASSEMBLY, which claims the benefit of and priority to U.S. Provisional Patent Application No. 62/406,184, filed on Oct. 10, 2016, entitled POLARIZED WINDOW ASSEMBLY, the entire disclosures of which are hereby incorporated herein by reference.

FIELD OF THE DISCLOSURE

The present disclosure generally relates to a window assembly, and more particularly, to a polarized window assembly.

BACKGROUND OF THE DISCLOSURE

Electro-optic assemblies are being used in various vehicular and building applications. Use of these assemblies, in various applications, can be limited by cost, as well as aesthetic and functional considerations. Heating of the electro-optic assemblies by incident electromagnetic radiation may be a problem for certain installations or uses. Accordingly, new electro-optic assembly designs, configurations and assemblies, along with methods of making them, are needed, particularly in view of reducing material and processing costs, improving aesthetics and/or enhancing functionality.

SUMMARY OF THE DISCLOSURE

According to one aspect of the present disclosure, a window assembly includes an electro-optic element which has a first substantially transparent substrate defining first and second surfaces. The second surface includes a first electrically conductive layer. A second substantially transparent substrate defines third and fourth surfaces. The third surface includes a second electrically conductive layer. A primary seal is disposed between the first and second substrates. The seal and the first and second substrates define a cavity therebetween. An electro-optic medium is disposed in the cavity. The electro-optic medium is switchable such that the electro-optic element is operable between substantially clear and darkened states. An absorptive layer is positioned on the fourth surface of the electro-optic element and a reflective layer is positioned on the absorptive layer.

According to another aspect of the present disclosure, a window assembly includes an electro-optic element having a first substantially transparent substrate defining first and second surfaces. A second substantially transparent substrate is spaced apart from the first substrate. The second substrate defines the third and fourth surfaces. A seal is disposed between the first and second substrates. The seal and the first and second substrates define a cavity therebetween. An electro-optic medium is disposed in the cavity. The electro-optic medium is switchable such that the electro-optic element is operable between substantially clear and darkened states. A pane is positioned proximate the first surface of the electro-optic element. A gap is defined between the pane and the electro-optic element. An absorptive layer and a reflective layer are positioned on the fourth surface of the electro-optic element. The reflective layer is positioned on an opposite side of the absorptive layer from the fourth surface.

According to yet another aspect of the present disclosure, a window assembly includes a first substrate defining a first major surface and a second major surface. A second substrate defines third and fourth major surfaces. A reflective layer is positioned proximate the second substrate. The reflective layer is positioned on an absorptive layer.

These and other aspects, objects, and features of the present disclosure will be understood and appreciated by those skilled in the art upon studying the following specification, claims, and appended drawings. It will also be understood that features of each example disclosed herein may be used in conjunction with, or as a replacement for, features of the other examples.

DETAILED DESCRIPTION

Figure 1A:
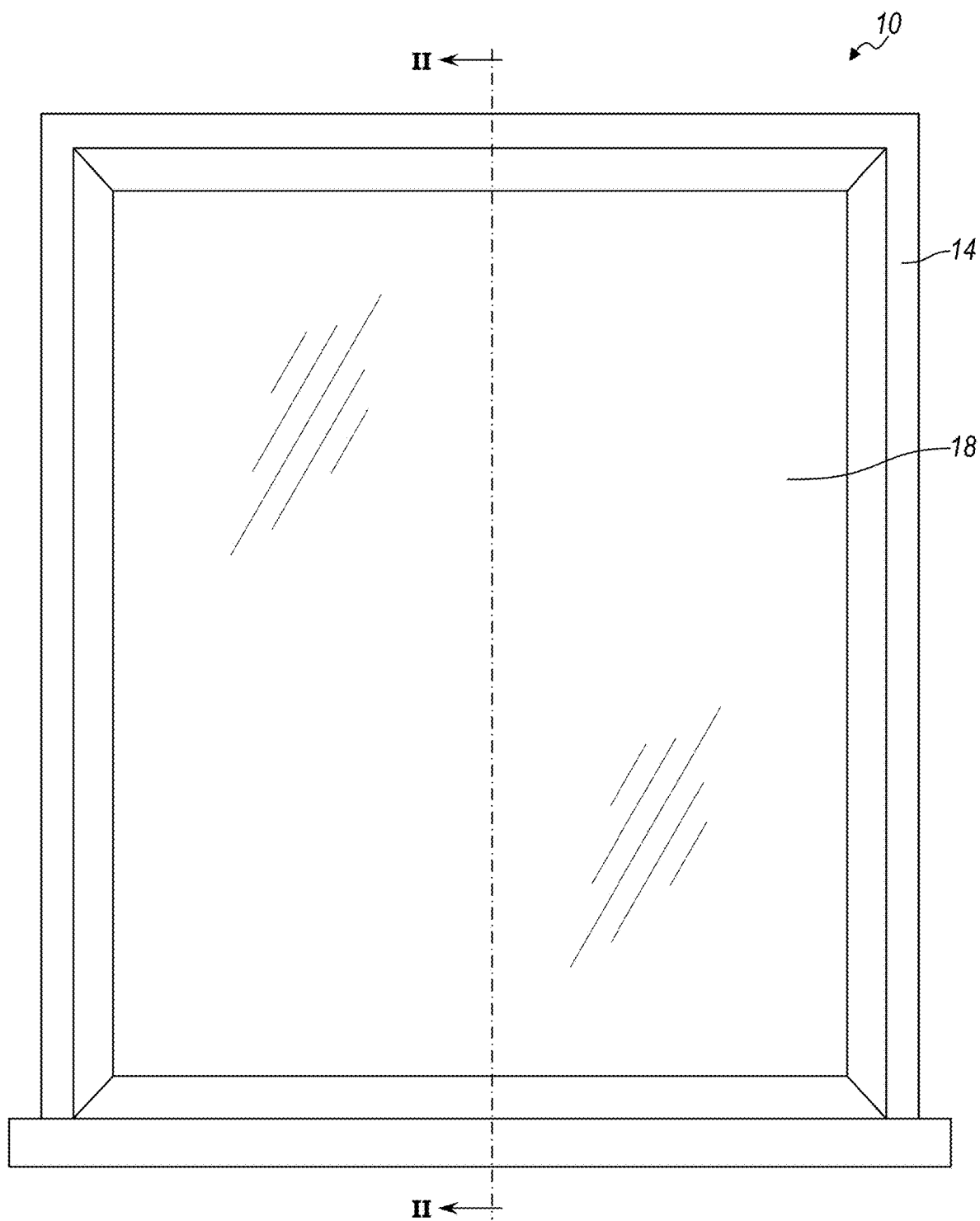
FIG. 1A is a front plan view of a window assembly, according to one example of the disclosure.

The present illustrated examples reside primarily in combinations of method steps and apparatus components related to a window assembly. Accordingly, the apparatus components and method steps have been represented, where appropriate, by conventional symbols in the drawings, showing only those specific details that are pertinent to understanding the examples of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1A-3, a window assembly 10 includes a frame 14 and an electro-optic element 18. The electro-optic element 18 includes a first substantially transparent substrate 22 having a first surface 26 and a second surface 30 disposed on opposite sides thereof. The second surface 30 includes a first electrically conductive layer 34. A second substantially transparent substrate 38 has a third surface 42 and a fourth surface 46 disposed on opposite sides thereof. The third surface 42 includes a second electrically conductive layer 50. A primary seal 54 is disposed between the first and second substrates 22, 38. The seal 54 and the first and second substrates 22, 38 cooperate to define a cavity 58 therebetween. An electro-optic medium 62 is disposed in the cavity 58. The electro-optic medium 62 is switchable and/or variably transmissive such that the electro-optic element 18 is operable between substantially clear and darkened states. The window assembly 10 also includes an infrared reflecting film 66, an absorptive layer 70 and a reflective layer 74. It will be understood that the infrared reflecting film 66 and the reflective layer 74 may be combined into a single or the same layer.

Referring to FIG. 1A, the window assembly 10 incorporates the electro-optic element 18 within the frame 14. The window assembly 10 may be employed in vehicles (e.g., trains, planes, automobiles, buses, boats) and buildings (e.g., houses, skyscrapers, strip malls). The window assembly 10 is operable between a transparent window state in which the window assembly 10 is substantially transparent to visible light, and a darkened state in which a portion, or no visible light (e.g., the window assembly 10 becomes essentially opaque), is transmitted through the window assembly 10. The transparent and darkened states of the window assembly 10 are carried out by changing the transmission states of the electro-optic element 18 between a substantially clear state and a substantially dark or darkened state, as well as intermediate states thereto. The darkened state of the electro-optic element 18 is defined relative to the transmissivity of the substantially clear state. Typical transmissivity of the electro-optic element 18 in the substantially clear state may be greater than about 50%, greater than about 55%, and greater than about 60%. The percentage of reflectance, transmittance and absorption of the electro-optic element 18 sum to 100%. Typical transmissivity of the electro-optic element 18 in the substantially darkened state may be less than about 1%, less than about 0.1%, less than about 0.01%, or less than about 0.001%. The frame 14 may operate to conceal edges of the electro-optic element 18. The frame 14 may also house and/or conceal electronics and mounting hardware used in the operation of the window assembly 10. When the window assembly 10 is in the transparent window state with the electro-optic element 18 in the substantially clear state, a viewer is able to look through the window assembly 10 to observe objects behind the window assembly 10.

Figure 1B:
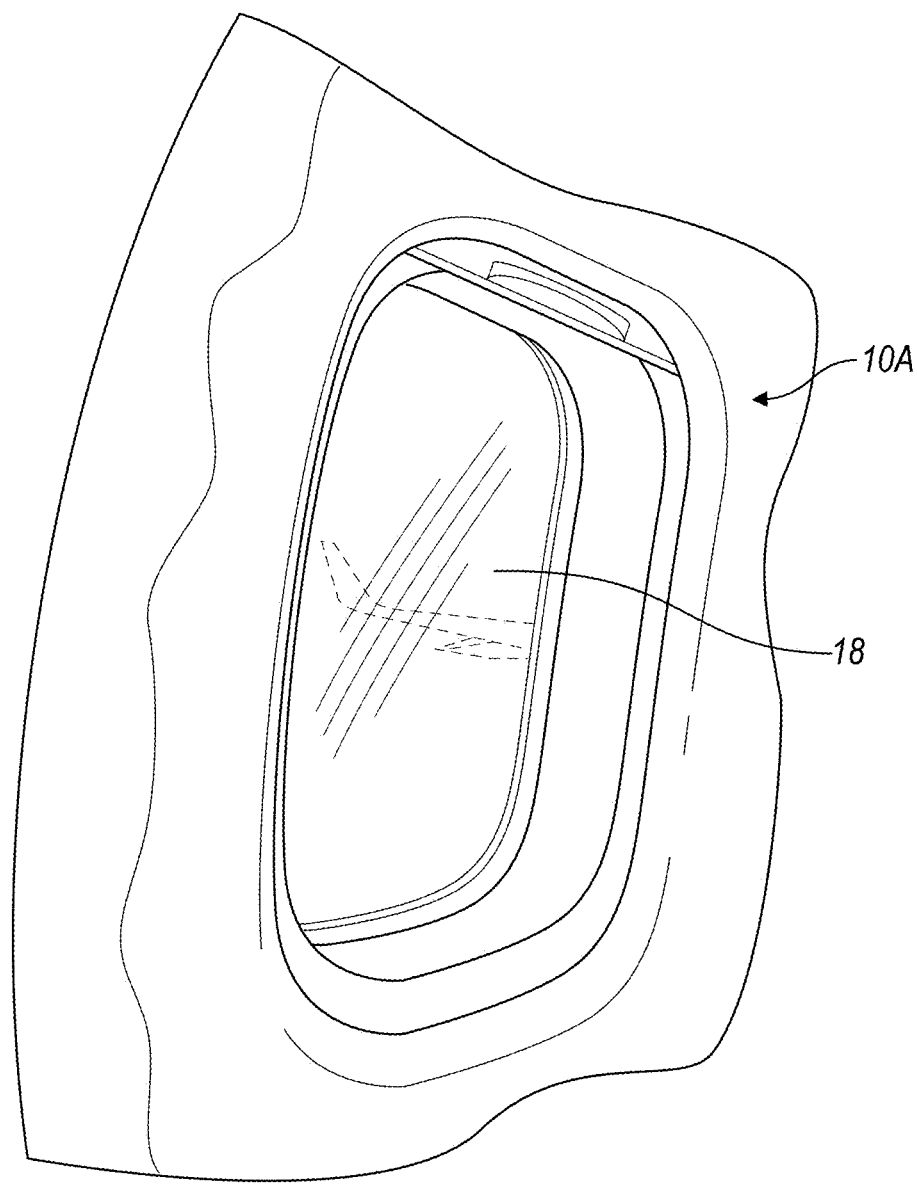
FIG. 1B is a perspective view of a vehicle window assembly, according to one example.

Referring now to FIG. 1B, the electro-optic element 18 may be used in a vehicle window assembly 10A. The vehicle window assembly 10A may be used in an airplane, automobile, bus, train, etc. It will be understood that this disclosure, although described in connection with the window assembly 10, may also be used with the vehicle window assembly 10A.

Figure 2:
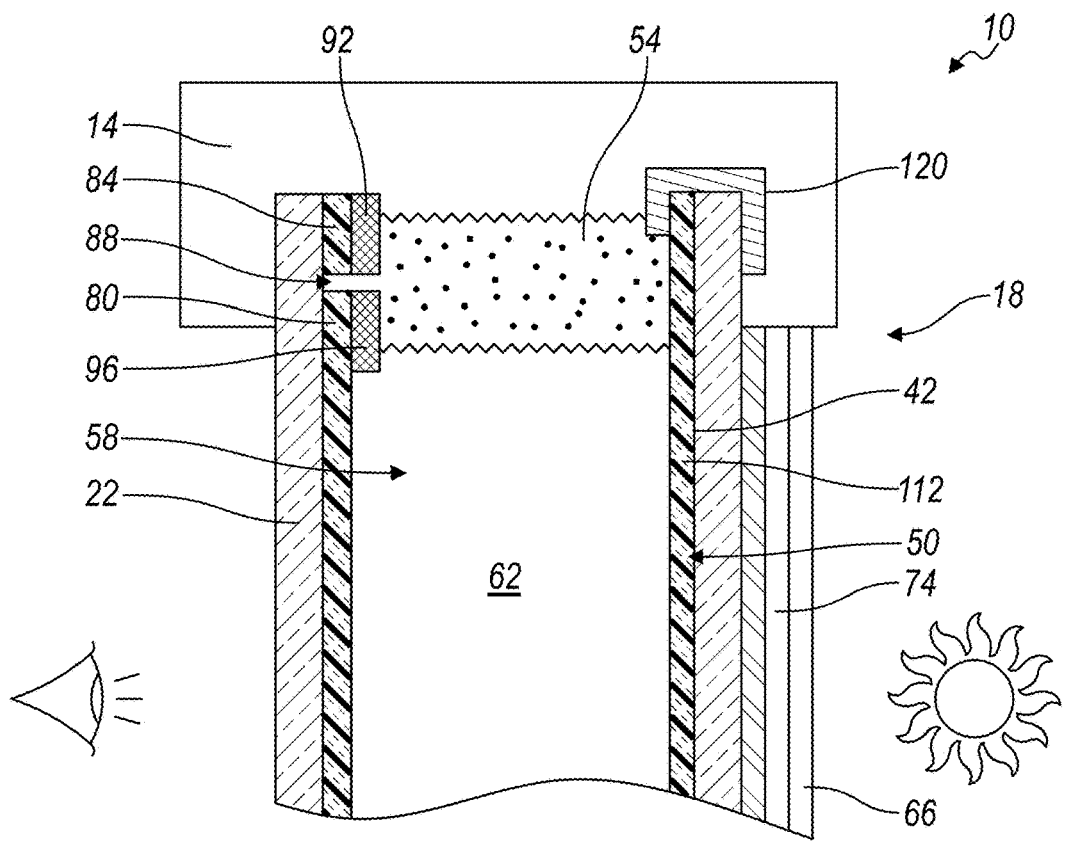
FIG. 2 is a cross-sectional view of the window assembly of FIG. 1A taken at line II, according to one example.
Figure 2:
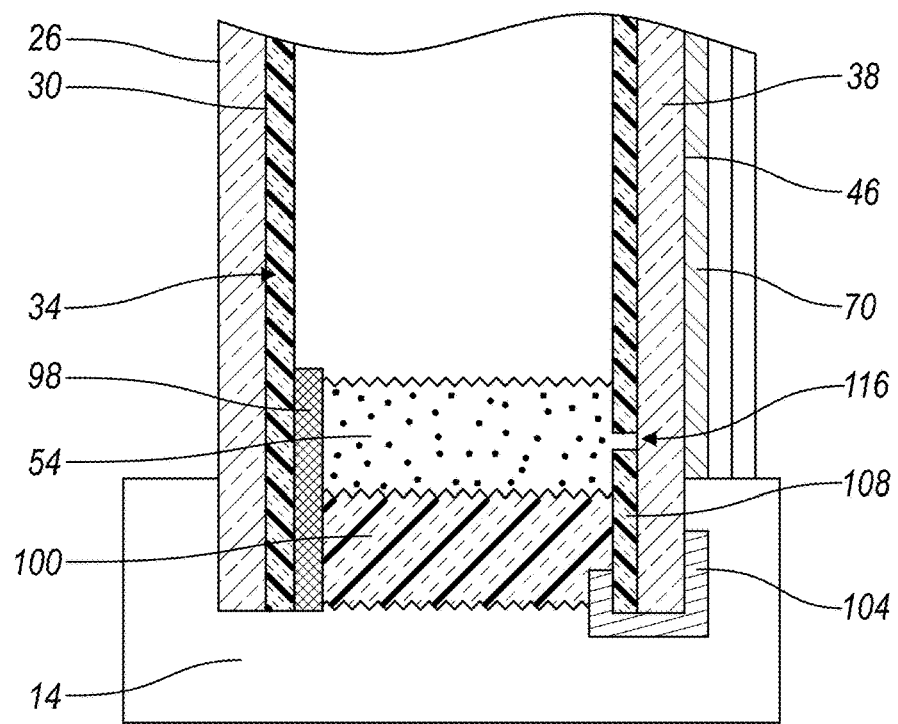

FIG. 2 generally depicts an enlarged cross-sectional view of the window assembly 10 of FIG. 1A revealing greater detail. In the example of FIG. 2, the electro-optic element 18 includes the first substrate 22 having the front or first surface 26 and the second surface 30. The first surface 26 is a viewer side, as indicated by an eye symbol, and is the inward, or viewer facing side, of the window assembly 10. A first conductive electrode portion 80 and a second conductive electrode portion 84 applied to the second surface 30 cooperate to define the first electrically conductive layer 34. The first and second conductive electrode portions 80, 84 are substantially electrically insulated from one another via a first isolation area 88. The first isolation area 88 cooperates with a portion of the primary seal 54 to define the second conductive electrode portion 84 and a second spectral filter portion 92, each substantially electrically insulated from the first conductive electrode portion 80 and a first spectral filter portion 96. This configuration allows for placement of an electrically conductive material 100 (e.g., a first conductive epoxy) adjacent to the primary seal 54. A first electrical clip 104 is in contact with the electrically conductive material 100 and is further in electrical communication with a third conductive electrode portion 108 and the electro-optic medium 62 disposed within the cavity 58. Electrical energy is passed through the first electrical clip 104, through the electrically conductive material 100 and across a third spectral filter portion 98 into the first electrically conductive layer 34.

Referring again to FIG. 2, the fourth surface 46 of the second substrate 38 is a sunlit side, as indicated by a sun symbol, and is an outward side on which sunlight falls on the window assembly 10. It will be understood that the window assembly 10 may be reoriented such that a viewer looks through the fourth surface 46 and the first surface 26 may be the sunlit side without departing from the spirit of this disclosure. In addition, it should be noted that the first substrate 22 may be larger than the second substrate 38 to create an offset along at least a portion of the perimeter of the window assembly 10. Additionally or alternatively, the first and second substrates 22, 38 may be offset relative to one another. The third conductive electrode portion 108 and a fourth conductive electrode portion 112 are shown proximate the third surface 42 and are electrically insulated via a second isolation area 116. The third and fourth conductive electrode portions 108, 112 cooperate to define the second electrically conductive layer 50. The second isolation area 116 cooperates with a portion of the primary seal 54 to define the fourth conductive electrode portion 112 that is substantially electrically insulated from the third conductive electrode portion 108. A second electrical clip 120 is in electrical communication with the fourth conductive electrode portion 112 and the electro-optic medium 62. It will be understood that examples of the window assembly 10 which do not use isolation gaps (e.g., the first and second isolation areas 88, 116) and/or conductive busses (e.g., the conductive material 100) may be utilized without departing from the teachings provided herein.

Still referring to FIG. 2, the primary seal 54 traverses an approximate perimeter of and is configured to cooperate with the first and second substrates 22, 38 to define the cavity 58 as substantially hermetic. The primary seal 54 may be applied to the first or second substrates 22, 38 by methods commonly used in the liquid crystal display (LCD) industry, such as by silk-screening or dispensing. The electro-optic medium 62 is disposed within the cavity 58, as shown in FIG. 2. The first and third spectral filter portions 96, 98 extend inboard from the primary seal 54 into the cavity 58 sufficiently far enough to generally conceal the primary seal 54 from a viewer.

According to at least one example, the electro-optic medium 62 is an electrochromic medium which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical field is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process For The Preparation Thereof and Use In Electrochromic Devices;" U.S. Pat. No. 6,519,072 entitled "Electrochromic Device;" and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety.

The absorptive layer 70 and the reflective layer 74 cooperate to prevent the electro-optic element 18 from heating to undesirable temperatures and/or to provide an aesthetically pleasing appearance to the window assembly 10. For example, when the electro-optic element 18 is in the darkened state, the absorption of visible light may cause the electro-optic element 18 to heat up. According to various examples, the absorptive layer 70 and the reflective layer 74 may include polarizers configured to absorb and reflect, respectively, certain polarizations of light to decrease the amount of incident light on the electro-optic element 18. By ordering the reflective layer 74 on an opposite side of the absorptive layer 70 than the viewer, the window assembly 10 may appear reflective when viewed from the fourth surface 46 and may provide acceptable transmission when viewed from the first surface 26 while minimizing reflection back toward the viewer.

The absorptive layer 70 may include one or more absorptive polarizers. The absorptive layer 70 may be configured to absorb a certain polarization (e.g., horizontal or vertical) of light. According to various examples, the absorptive polarizers of the absorptive layer 70 may be configured to absorb a polarization of light typically absorbed by polarized eyewear (e.g., horizontal). Examples of absorptive polarizers may include a Polaroid polarizing filter (e.g., stretched polyvinyl alcohol (PVA) plastic with an iodine doping or dichroic dye doping), elongated silver nanoparticles embedded in thin (e.g., ≤0.5 mm) glass plates (i.e., or in one of the substrates 22, 38), and combinations thereof.

The reflective layer 74 may include one or more reflective polarizers which are configured to reflect a certain polarization of light. The reflective layer 74 may be configured to reflect a certain polarization of light. According to various examples, the reflective polarizers of the reflective layer 74 may be configured to reflect a polarization of light typically absorbed by polarized eyewear (e.g., horizontal) or by the absorptive layer 70. The reflective polarizers of the reflective layer 74 may include a linear polarizer, an elliptical polarizer or a circular polarizer and might include an optical retarder such as a quarter-wave plate or a half-wave plate. A wire-grid polarizer provides one example of a reflective polarizer that may be used. Additionally or alternatively, the reflective polarizers may include a polymer-based film structure including at least one optically anisotropic layer. Such polymer-based film structure is generally referred to herein as an anisotropic polymer-based film (APBF). Non-limiting examples of APBFs are provided by a multilayered polymer film, including a body of alternating layers of a crystalline-based polymer and another selected polymer, or by microstructured film-based polarizers, such as brightness enhancement films, or by dual brightness enhancement films. According to various examples, the absorptive layer 70 is configured to absorb the same polarization of light the reflective layer 74 is configured to reflect.

Still referring to FIG. 2, the reflecting film 66 is positioned on the reflective layer 74. The reflecting film 66 may be configured to reflect a particular band of electromagnetic radiation (e.g., ultraviolet light, visible light, and/or infrared light) or more than one band of electromagnetic radiation. In a specific example, the reflecting film 66 may be configured to reflect near-infrared light (e.g., about 750 nm to about 1400 nm). The reflecting film 66 may include layers of dielectrics, layers of metal, or both metal layers and dielectric layers. Exemplary dielectric materials include $SiO_2$, $Ta_2O_5$, $NbO_5$, $TiO_2$, $HfO_2$, and combinations thereof. Examples of the reflecting film 66 may include a stack of alternating dielectric layers, a split reflector configuration or a triple reflector configuration. In various examples, the reflecting film 66 is highly transparent to visible light such that visibility through the window assembly 10 is not degraded. Infrared reflecting examples of the reflecting film 66 may be advantageous in that it would prevent the window assembly 10 from absorbing or transmitting infrared radiation. This may be desirable as the infrared radiation transmitted through the window assembly 10, or absorbed then emitted by the window assembly 10, may be experienced on the viewer side of the window assembly 10 as heat, which may be uncomfortable or increase a heat load of a vehicle or structure to which the window assembly 10 is attached. It will be understood that the reflecting film 66 may be configured as a coating, film, additional substrate, veneer, glaze, layer and/or covering may be incorporated into the reflective layer 74 without departing from the spirit of this disclosure. Such examples may be advantageous as, when viewed from an interior perspective in daylight, the window assembly 10 appears as a normal window (e.g., high transmission but low reflectivity), but when viewed from an exterior perspective, the window assembly 10 appears reflective (e.g., low transmission but highly reflective). As such, when viewed from the exterior, the window assembly 10 may provide enhance privacy.

Figure 3A:
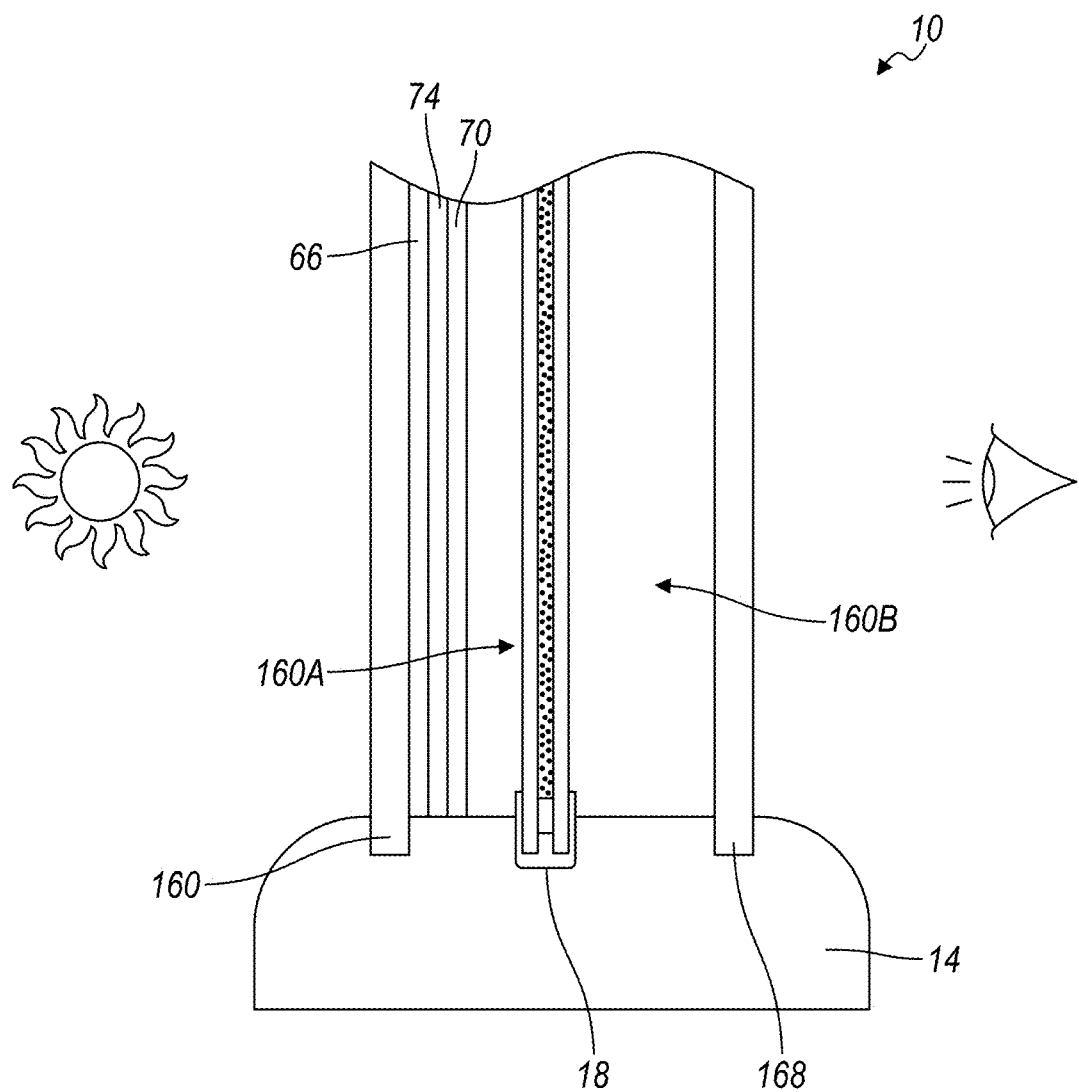
FIG. 3A is a cross-sectional view of a window assembly according to another example.

Referring now to FIG. 3A, depicted is a multi-pane example of the window assembly 10 incorporating the electro-optic element 18. The multi-pane window assembly 10 may include a first pane 160, a second pane 168. The first and/or second panes 160, 168 may include a glass, a plastic or other substantially transparent materials. Between the first and second panes 160, 168 and the electro-optic element 18 are a first interpane gap 160A and a second interpane gap 160B. The first and second interpane gaps 160A, 160B may be filled with a gas such as air, nitrogen, Argon, Krypton, other gases or combinations thereof. In another example, the first and second interpane gaps 160A, 160B may have a gas pressure of less than 1 atm, less than 0.5 atm, less than 0.1 atm, or less than about 0.01 atm.

In the depicted example, the first and second panes 160, 168 are positioned proximately, and on opposite sides of, the electro-optic element 18. As described herein, the light absorbed by the electro-optic element 18 may be converted to heat which may be dissipated. The packaging of the electro-optic element 18 next to additional panes (e.g., between the first and second panes 160, 168) traps heat by limiting convective cooling and absorptive trapping of radiated infrared energy from the electro-optic element 18. The trapped energy may drive the window assembly 10 to elevated temperatures. In the depicted example, the reflecting film 66, the absorptive layer 70 and the reflective layer 74 are positioned on an interior side of the first pane 160, but it will be understood that the reflecting film 66, the absorptive layer 70 and the reflective layer 74 may be positioned on an exterior surface of the of the first pane 160. Further, it will be understood that the orders of the reflecting film 66, the absorptive layer 70 and the reflective layer 74 may be changed without departing from the teachings provided herein.

Figure 3B:
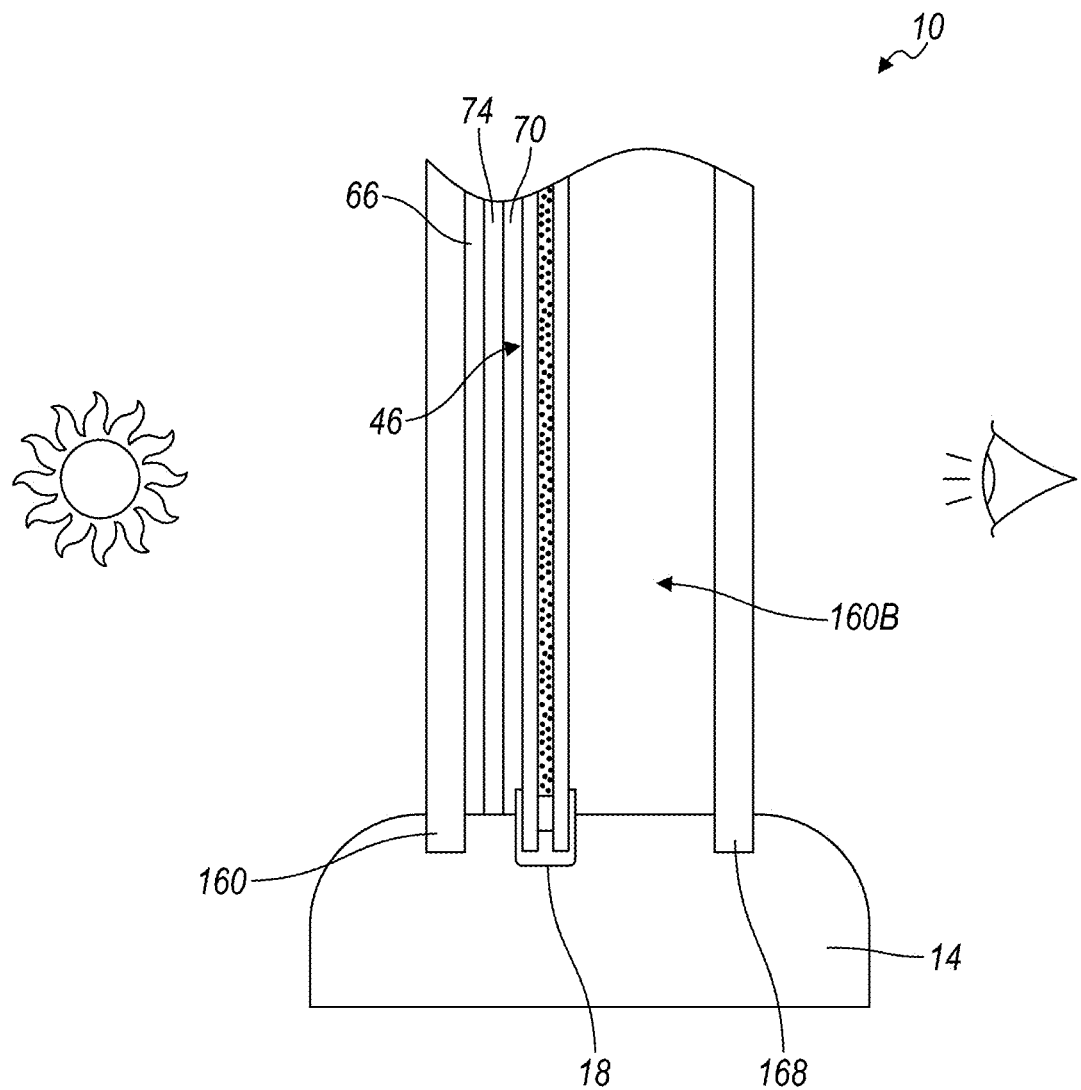
FIG. 3B is a cross-sectional view of a window assembly according to another example.

Referring now to FIG. 3B, in the depicted example, the absorptive layer 70 is positioned on the fourth surface 46 of the second substrate 38 and the reflective layer 74 is positioned on the absorptive layer 70. The infrared reflecting film 66 may be positioned on the first pane 160, or on the reflective layer 74. It will be understood that for the examples depicted in FIGS. 3A and 3B, the first pane 160 may additionally or alternatively be a coating or protective layer disposed over the infrared reflecting film 66 and/or the reflecting layer 74.

Figure 4:
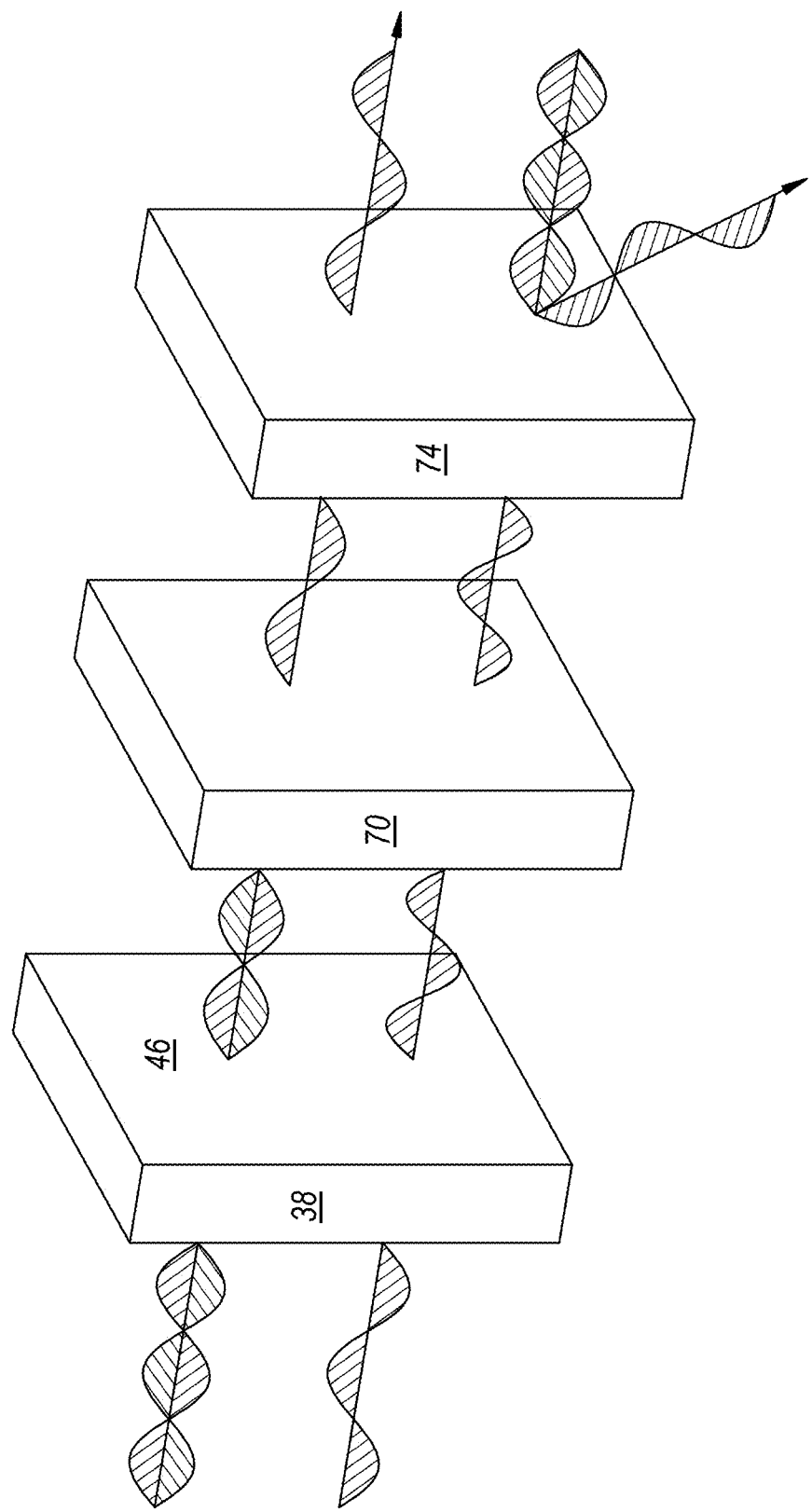
FIG. 4 is an exploded view of the window assembly, according to one example.

Referring now to FIG. 4, depicted is a schematic exploded view of the absorptive layer 70 and the reflective layer 74 on the fourth surface 46 of the second substrate 38. The use of the absorptive layer 70 and the reflective layer 74 may reduce a temperature of the electro-optic element 18 while in operation. In the darkened state, the electro-optic element 18 absorbs visible light and converts the light to heat. Under certain circumstances, the amount of heat generated by the electro-optic element 18 may be sufficient to damage the electro-optic element 18 as well as other components proximate the element 18 (e.g., the first and second panes 160, 168, the frame 14, etc.). In polarizer examples of the absorptive layer 70 and the reflective layer 74, a portion of the light may be prevented from contacting, and being absorbed by, the electro-optic element 18 by selectively removing (e.g., reflecting) one polarization of the light. By removing a polarization of light, the electro-optic element 18 may absorb upwards of 50% less light. According to various examples, the absorptive layer 70 may be configured to absorb the same polarization (e.g., horizontal) as the reflective layer 74 is configured to reflect. The ordering of the absorptive layer 70 and the reflective layer 74 relative to a viewer may be important based on the desired characteristics of the window assembly 10. In the depicted example, the absorptive layer 70 is positioned between the reflective layer 74 and a viewer or the interior of a vehicle and/or building. In such a configuration, the viewer on an interior side of the window assembly 10 looks through the absorptive layer 70 before the reflective layer 74 and a viewer on an exterior side looks through the reflective layer 74 first. When viewed from an exterior perspective, the window assembly 10 may have a reflective appearance as half of the light (e.g., one polarization of the light) falling on the window assembly 10 is reflected back toward the viewer by the reflective layer 74. However, by ordering the absorptive layer 70 and the reflective layer 74 in the depicted configuration, a viewer on the interior side of the window assembly 10 may not experience a reflection, but may experience a decreased transmission through the window assembly 10. When viewed from the interior side of the window assembly 10, the reflected polarization of the reflective layer 74 may first be absorbed by the absorptive layer 70 such that there is no light to be reflected back toward the interior side. As such, the window assembly 10 may not have a reflective appearance from a viewer side because there will not be horizontally polarized light to reflect back toward the viewer from the reflective layer 74.

Figure 5:
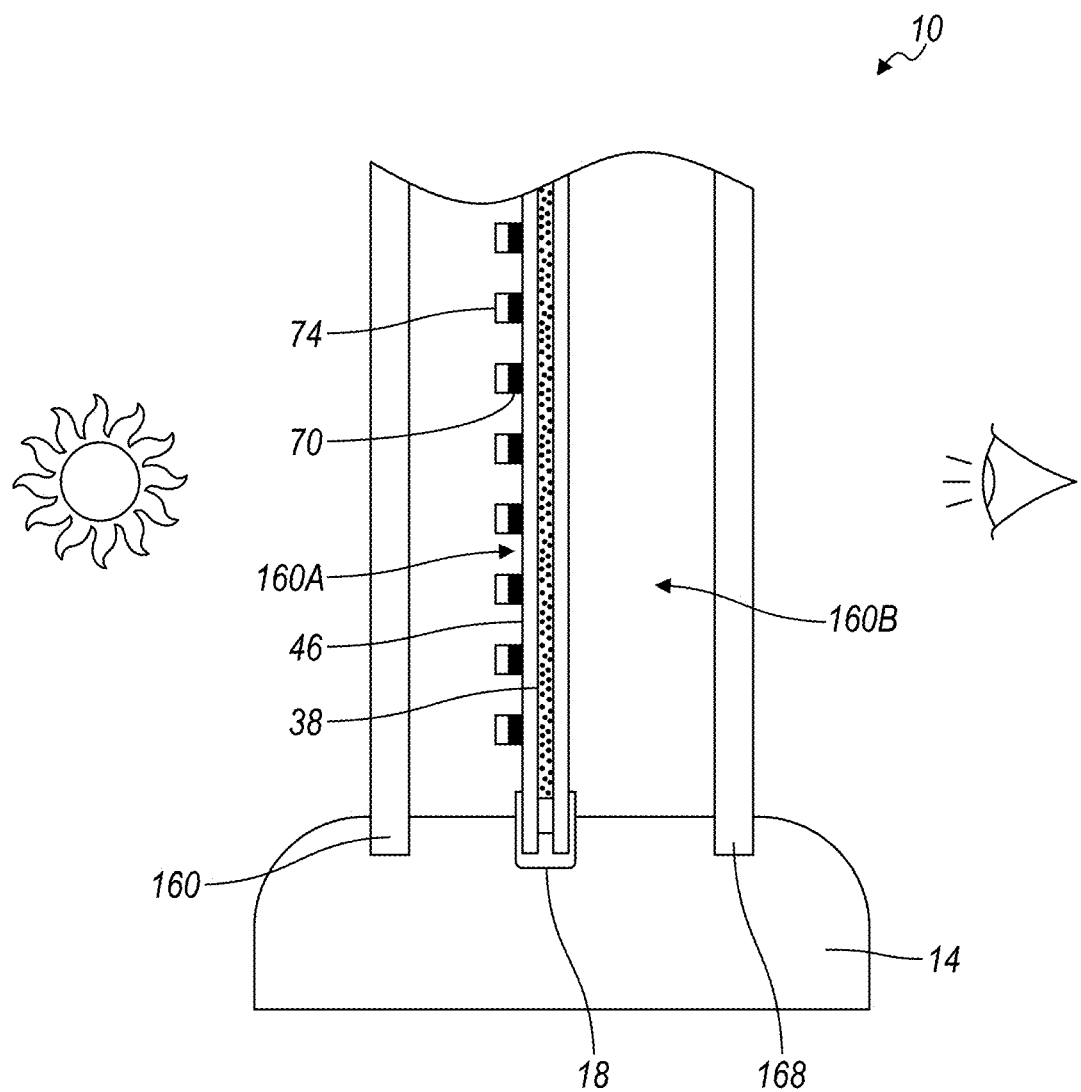
FIG. 5 is a cross-sectional view of a window assembly according to another example.

Referring now to FIG. 5, the absorptive layer 70 and the reflective layer 74 are depicted as a plurality of small dots. In such an example, the absorptive layer 70 may be configured to absorb multiple polarizations of light, but only occupy a portion of the window assembly 10. Such an absorptive layer 70 may appear dark or black due to the decrease in reflected light. The absorptive layer 70 is depicted as positioned on the fourth surface 46 of the second substrate 38 and the reflective layer 74 is positioned on the absorptive layer 70, but it will be understood that the ordering of the layers 70, 74 may be changed based on where in the window assembly 10 the layers 70, 74 are utilized. In the depicted example of FIG. 5, the reflective layer 74 may be configured to reflect all polarizations of light. The reflective layer 74 is positioned on the absorptive layer 70 such that from an interior viewer perspective, the reflective layer 74 is not visible (e.g., there is minimal to no reflection). Conversely, when viewed from an exterior perspective, the reflective layer 74 is visible such that substantial reflection is perceived. The absorptive and reflective layers 70, 74 may be applied in a variety of patterns (e.g., intermittent, discontinuous or continuous shapes) to the fourth surface 46 such as spots, stripes, or in a random orientation. Blank, transmissive space may be defined between the patterns of the absorptive and reflective layers 70, 74. In patterned examples, the absorptive and reflective layers 70, 74 may be sufficiently small that individual pattern features of the absorptive and reflective layers 70, 74 are not visible or perceptible to the viewer of the window assembly 10. Such small patterned absorptive and reflective layers 70, 74 may allow for an overall decrease in the transmission of the window assembly 10 when viewed from an interior perspective, but also give a reflective appearance when viewed from an exterior perspective, similar as to that described above in connection with the other examples.

Use of the present disclosure may offer a variety of advantages. First, by providing a reflective appearance to exterior viewers of the window assembly 10, the window assembly 10 may provide a privacy feature. Second, by utilizing the absorptive layer 70 and the reflective layer 74, the reflection of the window assembly 10 when viewed from an interior perspective, may be minimized. Third, by reflecting a selected polarization of light, a decreased amount of light is absorbed by the electro-optic element 18 of the window assembly 10 thereby reducing the amount of heat generated within the electro-optic element 18. Fourth, application of the infrared reflecting film 66 may further reduce heat generated and absorbed by the electro-optic element 18. Fifth, application of the absorptive layer 70 and the reflective layer 74 may provide for a simple manufacturing solution to reduce the amount of heat generated in the electro-optic element 18. Sixth, the present disclosure may equally be applied to insulated windows, single pane transparencies (e.g., in automotive windows), laminated structures (e.g., vehicle wind screens) and other locations to reduce heating due to absorbed light and/or to control the reflectivity when viewed from different angles.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims, unless these claims by their language expressly state otherwise.

What is claimed is:

1. A window assembly, comprising:
   an electro-optic element having an electro-optic medium switchable between clear and darkened states;
   an absorptive layer positioned on a surface of the electro-optic element; and
   a reflective layer disposed on the absorptive layer, wherein the reflective layer includes a reflective polarizer and the absorptive layer includes an absorptive polarizer.

2. The window assembly of claim 1, wherein the electro-optic element includes first and second substrates, and wherein the electro-optic medium is disposed between the first and second substrates.

3. The window assembly of claim 2, wherein the absorptive layer is positioned on an outward side of the first and second substrates.

4. The window assembly of claim 3, wherein the absorptive layer absorbs multiple polarizations of light and is applied in a pattern on the outward side of the second substrate.

5. The window assembly of claim 1, wherein the electro-optic medium is an electrochromic medium.

6. The window assembly of claim 5, wherein the electrochromic medium includes at least one solvent, at least one anodic material, and at least one cathodic material.

7. The window assembly of claim 1, wherein the window assembly includes a reflective appearance when viewed from an exterior perspective.

8. The window assembly of claim 1, wherein the absorptive layer absorbs the same polarization of light as the reflective polarizer reflects.

9. The window assembly of claim 1, wherein the reflective layer includes an infrared reflecting film.

10. The window assembly of claim 1, wherein the reflective layer includes a dual brightness enhancement film.

11. A window assembly, comprising:
    an electro-optic element operable between a clear state and a darkened state;
    at least one pane positioned proximate a first surface of the electro-optic element, wherein a gap is defined between the at least one pane and the electro-optic element;
    an absorptive layer positioned on the first surface of the electro-optic element;
    a reflective layer positioned proximate the first surface of the electro-optic element; and
    an infrared reflecting film positioned on at least one of the absorptive layer and the reflective layer, wherein the reflective layer includes a reflective polarizer and the absorptive layer includes an absorptive polarizer.

12. The window assembly of claim 11, wherein the infrared reflecting film is positioned on a surface of the at least one pane.

13. The window assembly of claim 11, wherein the infrared reflecting film includes dielectric layers.

14. The window assembly of claim 11, wherein the at least one pane includes a first pane and a second pane, and wherein the electro-optic element is disposed between the first pane and the second pane.

15. A window assembly, comprising:
- a first substrate defining a first surface and a second surface;
- a second substrate defining a third surface and a fourth surface, wherein an electro-optic medium is disposed between the second surface and the third surface;
- a polarizing reflective layer disposed on the third surface; and
- a polarizing absorptive layer positioned proximate the second substrate, wherein the polarizing reflective layer is positioned on the polarizing absorptive layer and the window assembly is free of a substrate between the second surface and the third surface.

16. The window assembly of claim 15, wherein the polarizing absorptive layer is configured to absorb a same polarization of light that the polarizing reflective layer is configured to reflect.

17. The window assembly of claim 15, wherein each of the first substrate and the second substrate comprises glass.

18. The window assembly of claim 15, further comprising:
- an infrared reflecting film positioned on one of the polarizing reflective layer and the polarizing absorptive layer.

19. The window assembly of claim 15, further comprising:
- a protective pane positioned proximate at least one of the first substrate and the second substrate.

* * * * *